United States Patent
Ma et al.

(10) Patent No.: US 8,306,143 B2
(45) Date of Patent: Nov. 6, 2012

(54) SYSTEM AND METHOD OF TRANSMIT DIVERSITY FOR WIRELESS COMMUNICATIONS

(75) Inventors: Chun-Ying Ma, Hsinchu (TW); Chia-Chi Huang, Hsinchu (TW)

(73) Assignee: National Chiao Tung University, Hsinchu (TW)

( * ) Notice: Subject to any disclaimer, the term of this patent is extended or adjusted under 35 U.S.C. 154(b) by 308 days.

(21) Appl. No.: 12/840,811

(22) Filed: Jul. 21, 2010

(65) Prior Publication Data
US 2011/0299616 A1    Dec. 8, 2011

(30) Foreign Application Priority Data
Jun. 3, 2010 (TW) .............................. 99117872 A

(51) Int. Cl.
*H04B 7/02* (2006.01)
*H04L 1/02* (2006.01)

(52) U.S. Cl. ........ 375/267; 375/299; 375/347; 375/346; 375/349; 455/500; 455/504; 455/506; 455/101

(58) Field of Classification Search .................. 375/267, 375/299, 347, 346, 349; 455/500, 504, 506, 455/101
See application file for complete search history.

(56) References Cited

U.S. PATENT DOCUMENTS

| | | | | |
|---|---|---|---|---|
| 5,507,035 A | * | 4/1996 | Bantz et al. | 455/133 |
| 5,692,019 A | * | 11/1997 | Chang et al. | 375/347 |
| 6,373,832 B1 | * | 4/2002 | Huang et al. | 370/342 |
| 7,174,178 B2 | * | 2/2007 | Bergel | 455/502 |
| 2003/0162519 A1 | * | 8/2003 | Smith et al. | 455/277.1 |
| 2008/0108310 A1 | * | 5/2008 | Tong et al. | 455/69 |

* cited by examiner

*Primary Examiner* — Phuong Phu

(74) *Attorney, Agent, or Firm* — Peter F. Corless; Steven M. Jensen; Edwards Wildman Palmer LLP

(57) ABSTRACT

A system and method of transmit diversity for wireless communication. The system includes a transmitting terminal having a plurality of transmission antennas and a receiving terminal having a plurality of receiving antennas. The method includes analyzing channel state information obtained by the transmitting terminal; selecting an antenna to be one in use from the receiving antennas; matching the selected antenna in use with the wireless signals that are to be transmitted; transmitting wireless signals that are matched to the receiving terminal for being calculated and determining the pre-selected antenna in use, thereby significantly reducing complexities of the receiving terminal.

10 Claims, 6 Drawing Sheets

SYSTEM AND METHOD OF TRANSMIT DIVERSITY FOR WIRELESS COMMUNICATIONS

CROSS-REFERENCES TO RELATED APPLICATIONS

This application claims under 35 U.S.C. §119(a) the benefit of Taiwanese Application No. 99117872 filed Jun. 3, 2010, the entire contents of which is incorporated herein by reference.

BACKGROUND OF THE INVENTION

1. Field of the Invention

This invention relates to systems and methods of transmit diversity for wireless communication, and particularly, to a system and method for wireless communication by employing a transmit diversity technique in a wireless multiple-input multiple-output (MIMO) system.

2. Description of Related Art

With the rapid development of communication technology, providing high-speed and reliable transmission services is becoming one of the most popular issues in the art. A multi-input multi-output (MIMO) wireless communication technique uses a plurality of antennas in a transmitting terminal and a receiving terminal, and may be applied to improve the performance of wireless mobile Internet services and next-generation cellular systems.

Currently, in an MIMO wireless communication system a diversity technique is proposed to increase the transmission reliability of the wireless communication system. The diversity technique of the transmission terminal may be categorized into three groups. The first one evaluates channels in the receiving terminal, and feeds messages back to the transmitting terminal. The second one uses a space time code or space frequency code technique. The third one uses a maximum ratio transmission technique. The aforesaid three techniques operate based on a condition that the receiving terminal and the transmitting terminal know the channel state information. Additionally, U.S. Pat. No. 7,362,823 B2 proposed a diversity algorithm that transmits and receives information under a condition that both the transmitting terminal and the receiving terminal have channel state information. U.S. Pat. No. 7,107,021 B2 disclosed an antenna-switching technique that is applied to a code division multiple access (CDMA) system, by measuring the power of signals with the receiving terminal and feeding the result back to the transmitting terminal, so as to obtain a diversity effect. Taiwanese patent No. 588520 and No. I298588 disclosed a diversity reception device that evaluates channels in the receiving terminal, so as to achieve the diversity effect.

The transmitting terminal and receiving terminal may be a base station or a user-end electronic device, for example. However, a receptor of a general user, such as a smart phone, notebook computer or personal digital assistant (PDA), has to have a simpler design, as compared with a base station. The receiving terminal's requesting the evaluation of channel state information may complicate the operation and hardware of the receiving terminal. Besides, the receiving terminal has to transmit the evaluation result or measured power back to the transmitting terminal, which sacrifices the communication capacity of both the receiving terminal and the transmitting terminal.

Therefore, how to provide a system and method for wirelessly transmitting and receiving information under a condition that the receiving terminal does not know the channel state information, so as to bring the spatial diversity technique of the receiving terminal into practice, not to consume the efficacy of the communication system and to greatly simplify the hardware and algorithm of the receiving terminal is becoming one of the most popular issues in the art.

SUMMARY OF THE INVENTION

In view of the above-mentioned problems of the prior art, the present invention provides a system of transmit diversity for wireless communication. The system comprises a transmitting terminal having a plurality of channel state information, and a receiving terminal, wherein the transmitting terminal includes a processing module for analyzing the channel state information and matching wireless signals that are to be transmitted, and a plurality of transmission antennas for transmitting wireless signals that are matched, and the receiving terminal includes a plurality of receiving antennas for receiving the wireless signals that are matched from the transmitting terminal, and a determination module for calculating the wireless signals that are matched received by the receiving antennas to select at least one antenna from the receiving antennas that has a better channel state to be an antenna in use, wherein the transmitting terminal, before transmitting the wireless signals that are matched, pre-selects the antenna in use from the receiving antennas according to the channel state information, and processes the wireless signals to allow the wireless signals to be matched with the antenna in use.

In an embodiment of the present invention, the receiving terminal transmits pilot signals to the transmission antennas via each of the receiving antennas at a predetermined interval, allowing the transmitting terminal to evaluate a channel state according to the pilot signals and obtain the channel state information.

The present invention further provides a method of transmit diversity for wireless communication. The method is applicable to a wireless communication system including a transmitting terminal having a plurality of transmission antennas and a receiving terminal having a plurality of receiving antennas, and comprises the following steps of: (1) enabling the receiving antennas to transmit pilot signals to the transmission antennas; (2) enabling the transmitting terminal to evaluate a channel state according to the pilot signals, and to obtain a plurality of channel state information; (3) enabling the transmitting terminal to analyze the channel state information, to pre-select one from the receiving antennas to be an antenna in use; (4) enabling the transmitting terminal to match wireless signals that are to be transmitted with the antenna in use; (5) enabling the transmitting terminal to transmit the wireless signals that are matched to the receiving terminal; and (6) enabling the receiving terminal to receive the wireless signals that are matched from the transmitting terminal, and to calculate the wireless signals that are matched, to determine the antenna in use that is pre-selected by the transmitting terminal.

In an embodiment of the present invention, in step (4) the transmitting terminal matches the wireless signals that are to be transmitted with the antenna in use by adjusting a gain of each of the transmission antennas, to allow the wireless signals to be matched with the antenna in use, and that wireless signals are matched with the antenna in use means that the wireless signals that are matched received by the antenna in use are a real multiple of the wireless signals, and that a strength of signals that the antenna in use receives is greater than another strength of signals that the rest of the receiving antennas receive.

Compared with the prior art, the transmitting terminal of the present invention uses the evaluated channel state information to select an antenna in use of the receiving terminal, and processes wireless signals that are to be transmitted, in order to match with the antenna in use, and the receiving terminal of the present invention determines the antenna in use pre-selected by the transmitting terminal by using various algorithms. Therefore, the system and method of transmit diversity for wireless communication of the present invention may reduce the complexity of the receiving terminal and bring the advantage of the spatial diversity technique of the receiving terminal into practice.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The following illustrative embodiments are provided to illustrate the disclosure of the present invention, these and other advantages and effects can be apparently understood by those in the art after reading the disclosure of this specification. The present invention can also be performed or applied by other different embodiments. The details of the specification may be on the basis of different points and applications, and numerous modifications and variations can be devised without departing from the spirit of the present invention.

Figure 1:
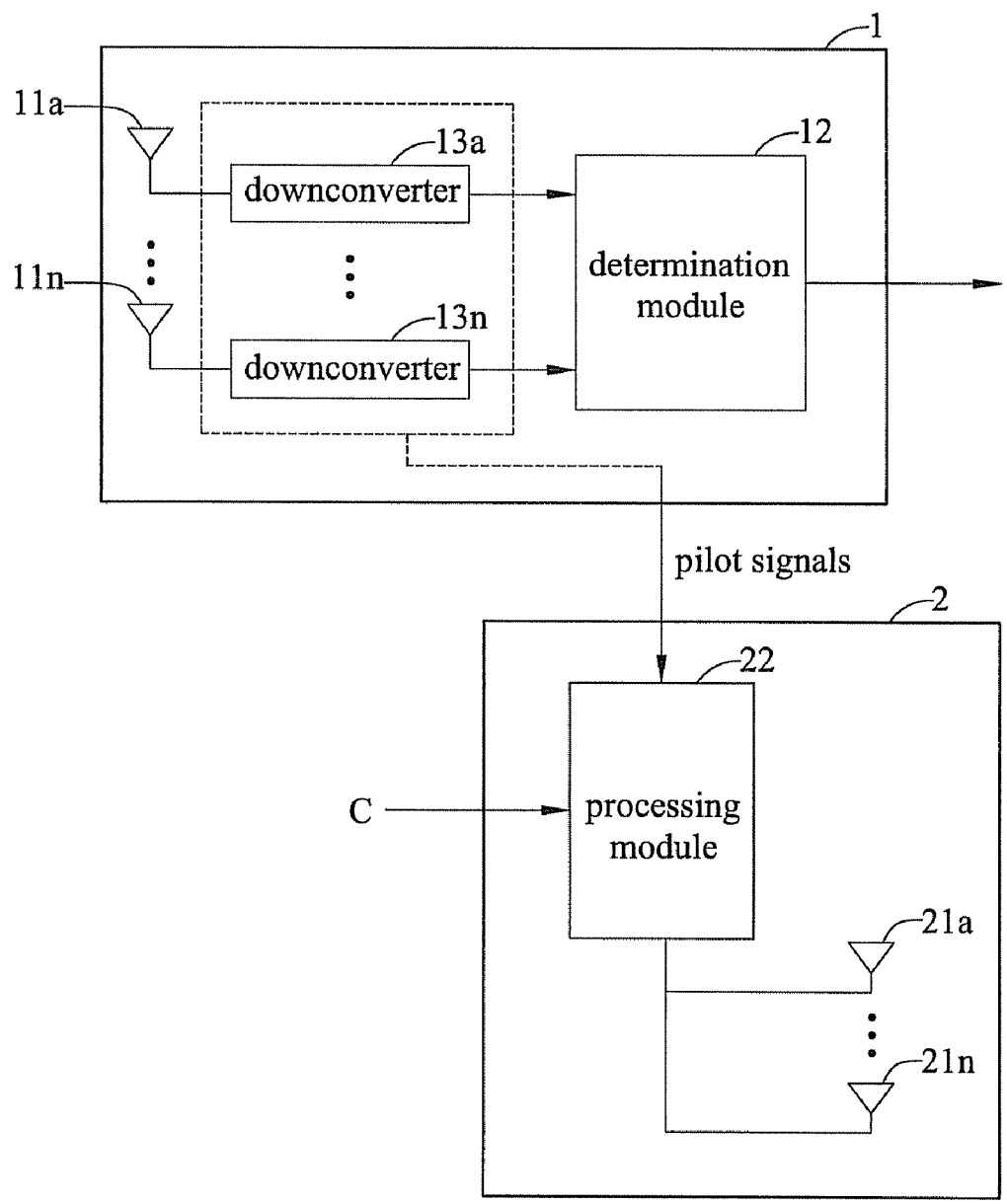
FIG. 1 is a functional block diagram of a system of transmit diversity for wireless communication according to the present invention.

FIG. 1 is a functional block diagram of a system of transmit diversity for wireless communication according to an embodiment of the present invention. The system may be applied to an MIMO system. As shown in FIG. 1, a receiving terminal 1 comprises a plurality of receiving antennas 11a-11n and a determination module 12, and a transmitting terminal 2 comprises a plurality of transmission antennas 21a-21n and a processing module 22. In an embodiment of the present invention, the receiving terminal 1 may comprise any number of receiving antennas, and the transmitting terminal 2 may also comprise any number of transmission antennas.

The transmitting terminal 2 has a plurality of channel state information, and transmits pilot signals via the receiving antennas 11a-11n to the transmission antennas 21a-21n at a predetermined interval, to allow the transmitting terminal 2 to evaluate a channel state according to the pilot signals and obtain the channel state information.

The processing module 22 analyzes the channel state information, and matches wireless signals C that are to be transmitted. The word "match" means that the transmitting terminal 2 pre-selects an antenna in use from the receiving antennas 11a-11n according to the channel state information (i.e., to determine which one of the receiving antennas 11a-11n that the receiving terminal 1 should use), and that the processing module 22 adjusts a gain of each of the transmission antennas 21a-21n by referring to the channel state information, to allow the wireless signals that are matched and received by the antenna in use of the receiving terminal 1 are a real multiple of the original wireless signals C, and to allow a strength of signals that the antenna in use receives is greater than another strength of signals that the rest of the receiving antennas 11a-11n receive.

The transmission antennas 21a-21n transmit the wireless signals that are matched to the receiving terminal 1.

The receiving antennas 11a-11n receive the wireless signals that are matched from the transmitting terminal 2.

The determination module 12 calculates the wireless signals that are matched received by the receiving antennas 11a-11n, to select one from the receiving antennas 11a-11n that has a better channel state to be an antenna in use. As described previously, the transmitting terminal 2, before transmitting the wireless signals that are matched, pre-selects the antenna in use from the receiving antennas 11a-11n.

In details, the receiving antennas 11a-11n transmit the pilot signals via downconverters 13a-13n to the transmitting terminal 2 at a predetermined interval; then, the transmission antennas 21a-21n individually receive the pilot signals transmitted from the receiving antennas 11a-11n, to allow the processing module 22 to obtain a plurality of channel state information between the transmission antennas 21a-21n and the receiving antennas 11a-11n according to the pilot signals; then, the transmitting terminal 2 analyzes the channel state information, pre-selects a receiving antenna from the receiving antennas 11a-11n to be an antenna in use, matches the wireless signals that are matched with the antenna in use, and transmits the wireless signals that are matched to the receiving terminal 1, wherein the word "match" means pre-filtering, up-converting to radio frequency, etc.; and the receiving terminal 1 calculates the wireless signals that are matched, to determine the antenna in use that is pre-selected by the transmitting terminal 2.

In an embodiment of the present invention, the determination module 12 calculates the wireless signals that are matched received by the receiving terminal 1 according to a statistical characteristic of the received wireless signals that are matched and a constellation graph.

It can be known from the description relating FIG. 1 that under a condition that the receiving terminal 1 does not have channel state information, the transmitting terminal 2 analyzes the channel state information and matches the wireless signals, such that the receiving terminal 1 may determine the antenna in use that is pre-selected by the transmitting terminal 2 by performing a simple calculation process on the wireless signals that are matched, which is because the receiving terminal 1, when having no channel state information, cannot determine which one of the receiving antennas has a better or the best channel state. Through the method of the present invention, the receiving terminal 1, after the transmitting terminal 2 matches the wireless signals, may receive signals in an easy way. Therefore, the receiving terminal 1 may have a simple hardware (or software).

Figure 2:
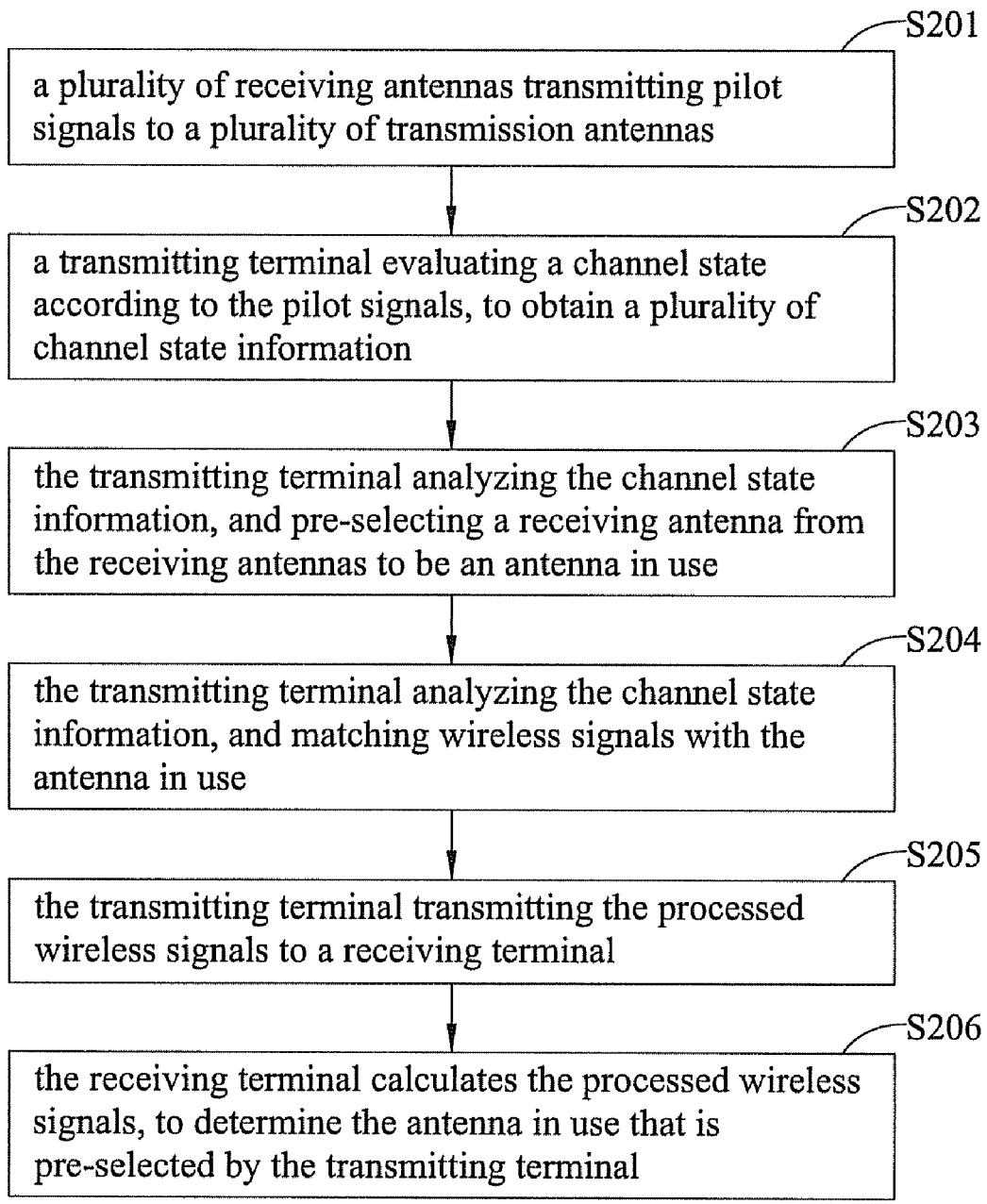
FIG. 2 is a flow chart of a method of transmit diversity for wireless communication according to the present invention.

FIG. 2 is a flow chart of a method of transmit diversity for wireless communication according to an embodiment of the present invention. The method is applicable to a wireless communication system including a transmitting terminal having a plurality of transmission antennas and a receiving terminal having a plurality of receiving antennas, as the system shown in FIG. 1.

In step S201, each of the receiving antennas transmit pilot signals to each of the transmission antennas. Then proceed to step S202.

In step S202, the transmitting terminal evaluates a channel state according to the pilot signals, to obtain a plurality of channel state information. Then proceed to step S203.

In step S203, the transmitting terminal analyzes the channel state information, and pre-selects a receiving antenna from the receiving antennas to be an antenna in use. Then proceed to step S204.

In step S204, the transmitting terminal analyzes the channel state information, and matches wireless signals by adjusting a gain of each of the transmission antennas, such that the wireless signals are matched with the antenna in use. The word "match" means that the wireless signals that are matched and received by the antenna in use are a real multiple of the wireless signals, and that a strength of signals that the antenna in use receives is greater than another strength of signals that the rest of the receiving antennas receive. Then proceed to step S205.

In step S205, the transmitting terminal transmits the wireless signals that are matched to the receiving terminal. Then proceed to step S206.

In step S206, the receiving terminal calculates the wireless signals that are matched, to determine the antenna in use pre-selected by the transmitting terminal. In an embodiment of the present invention, the receiving terminal calculates the wireless signals that are matched according to a statistical characteristic of the received wireless signals that are matched and a constellation graph.

It can be known from the description of FIG. 2 that the receiving terminal does not evaluate the channel state, and thus will not occupy a channel capacity in order to transmit an evaluation result. On the other hand, the transmitting terminal selects an antenna in use by analyzing the channel state information, and matches wireless signals with the antenna in use. Therefore, the efficacy of the communication system is not consumed and the complexity of the receiving terminal is greatly reduced.

Figure 3:
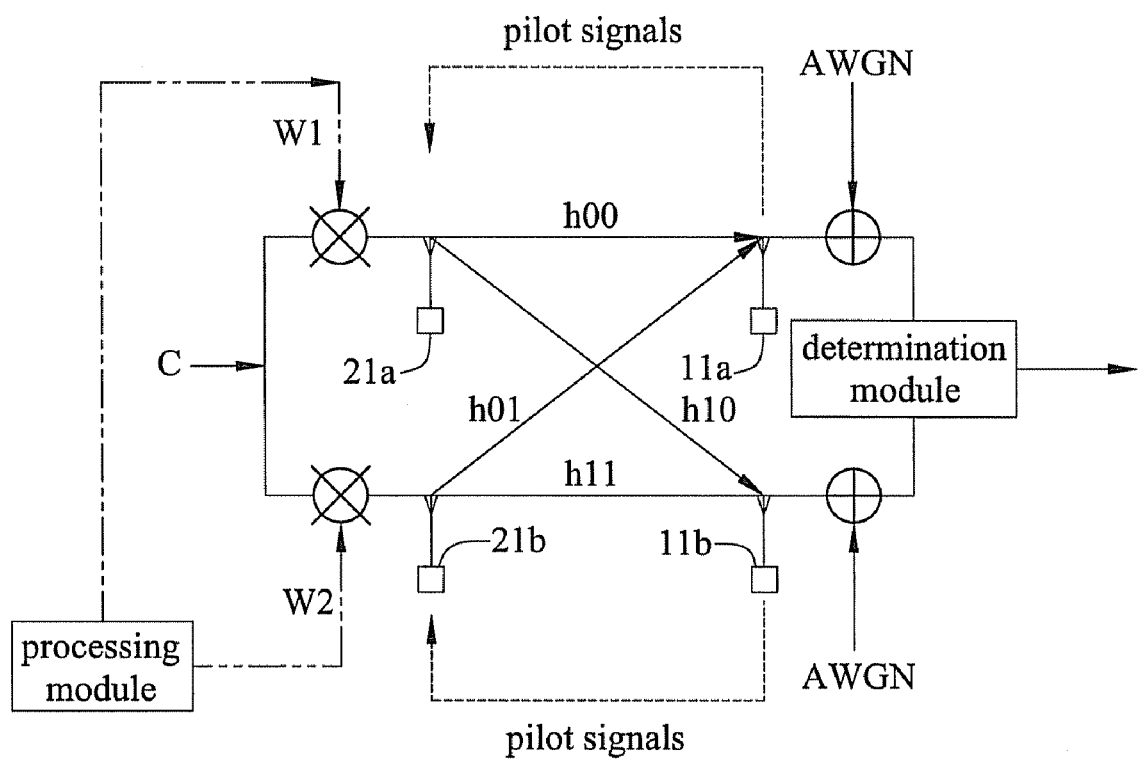
FIG. 3 is an application diagram of a system of transmit diversity for wireless communication of an embodiment according to the present invention.

Referring to FIG. 3, an application diagram of a system of transmit diversity for wireless communication of an embodiment is shown according to an embodiment of the present invention. In FIG. 3, a receiving terminal has two receiving antennas 11a and 11b, and a transmitting terminal also has two transmission antennas 21a and 21b.

In the beginning, the receiving antennas 11a and 11b transmit pilot signals to the transmission antennas 21a and 21b, respectively, to allow the transmitting terminal to evaluate a channel state according to the pilot signals and obtain four channel state information. As shown in FIG. 3, h00, h10, h01 and h11 are channel state information between the antennas 11a and 21a, the antennas 11b and 21a, the antennas 11a and 21b and the antennas 11b and 21b, respectively. In general, the receiving terminal has additive white Gaussian noises (AWGN).

Afterwards, the processing module 22 analyzes the four channel state information h00, h10, h01 and h11, to select an antenna in use for the receiving terminal (may be the antenna 11a or 11b), and calculates gain coefficients w1 and w2 of the transmission antennas 21a and 21b, to allow wireless signals C to be matched with the antenna in use for the receiving terminal. After matched by the processing module 22, wireless signals that the antenna in use receives are a real multiple of the wireless signals C. Moreover, a strength of signals that the antenna in use receives is greater than another strength of signals that the rest of the receiving antennas receive. Accordingly, the determination module 12 may determine which receiving antenna is the antenna in use selected by the transmitting terminal by performing a simple calculation process on signals that are transmitted from the transmission antennas 21a and 21b to the receiving antennas 11a and 11b.

A method of using a transmitting terminal to analyze communication state information and calculate better receiving antennas and better gain coefficients is described in the following paragraphs. In an embodiment of the present invention, the method may employ a selective maximum ratio transmission (SMRT) method.

It is assumed that there are K transmission antennas in a wireless communication system, and that wireless signals at each transmission antennas are respectively multiplied by a complex gain $w_k$, where k=1, 2, ..., K, before transmitted to a receiving terminal.

It is assumed that $h_{ij}$ denotes channel state information from the ith transmission antenna to the jth receiving antenna.

A better receiving antenna is calculated according to an equation $$k_f = \mathop{\mathrm{argmax}}_{j} \sum_{i=1}^{L} |h_{ij}|^2.$$

Gain coefficients of transmission antennas are calculated according to an equation $$w_i = h_{ik_f}^* \bigg/ \sum_{i=1}^{K} |h_{ik_f}|^2,$$

where i=1, 2, ..., K.

Therefore, the transmitting terminal selects $k_f$ to be an antenna in use for the receiving terminal, and a gain of the transmission antenna is set to be $w_i$. Accordingly, wireless signals that the antenna in use receives are wireless signals that are not matched respectively multiplied by the aforesaid gain coefficient $w_i$.

A method of determining which one of the receiving antennas is the antenna in use $k_f$ is described in the following paragraphs. It is noted that signals transmitted from a transmitting terminal to a receiving terminal may contain reference symbols. In a first embodiment, a calculation method is described that the transmission terminal does not transmit any reference symbol to the receiving terminal. In a second embodiment, another method is described that the transmission terminal transmits reference symbols to the receiving terminal. In an embodiment, signals transmitted from the transmitting terminal to the receiving terminal are divided into multi-phase shift keying (MPSK) signals and multi-quadrature amplitude modulation (MQAM) signals.

The First Embodiment

It is assumed that the receiving terminal has L antennas, signals received include y1[n], y2[n], ... and yL[n], n is an index of received symbols, and $y_k[n]=I_k+jQ_k[n]$. Please note that y1[n], y2[n], . . . and yL[n] are signals received by the antennas of the receiving terminal.

It is assumed that channel information are constant in S symbols. When signals transmitted from the transmitting terminal to the receiving terminal pertain to QPSK signals, in a calculation part of the receiving antennas, three different methods may be used to determine an antenna in use pre-selected by the transmitting terminal.

The First Method:

$$\text{Let } z_k = -\text{Re}\left\{\sum_{n=1}^{S}(y_k)^4\right\}, k = 1, 2, \ldots, L.$$

$$\text{Let } p = \underset{k}{\operatorname{argmax}}\{z_k\}.$$

The receiving terminal determines that an antenna p is the antenna in use. The receiving terminal thus selects the antenna p to receive signals and turns off the rest antennas.

The Second Method:

$$\text{Let } z_k = \sum_{n=1}^{S}(|I_k[n]| + |Q_k[n]| - (\sqrt{2}+1)(|I_k[n]| - |Q_k[n]|)).$$

$$\text{Let } p = \underset{k}{\operatorname{argmax}}\{z_k\}.$$

The receiving terminal determines that an antenna p is the antenna in use. The receiving terminal thus selects the antenna p to receive signals and turns off the rest antennas.

The Third Method:

$$\text{Let } z_k = \sum_{n=1}^{S}(2|I_k[n]Q_k[n]| - |I_k^2[n] - Q_k^2[n]|).$$

$$\text{Let } p = \underset{k}{\operatorname{argmax}}\{z_k\}.$$

The receiving terminal determines that an antenna p is the antenna in use. The receiving terminal thus selects the antenna p to receive signals and turns off the rest antennas.

Figure 4A:
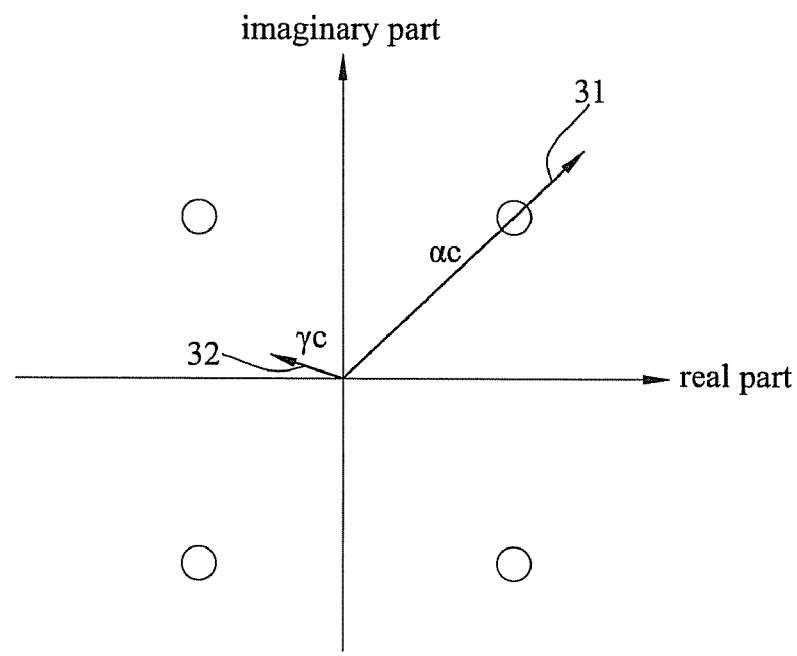
FIG. 4A is a schematic diagram of a statistical characteristic of a QPSK signal and a constellation graph of a method of transmit diversity for wireless communication of a first embodiment according to the present invention.

Referring to FIG. 4A, it is a schematic diagram of a statistical characteristic of a QPSK signal and a constellation graph of a method of transmit diversity for wireless communication according to the present invention. The constellation graph shows signals of the receiving antennas before noises are added.

As shown in FIG. 4A, on the constellation graph with real numbers and imaginary numbers as x-axis and y-axis, respectively, a quadrature phase shift keying (QPSK) technique is applied to a transmission system having two receiving antennas and two transmission antennas, where circles represent constellation graph points, and arrows 31 and 32 represent two wireless signals αc and γc (where α is a real number, while γ is an imaginary number and has an absolute value less than that of α) that are matched by a transmitting terminal received by the two receiving antennas, respectively. Through the aforesaid methods, the receiving terminal can determine which one of the two receiving antennas receives signals that have a greater strength, and the signals αc that are matched with the wireless signals that are matched by the transmitting terminal.

Figure 4B:
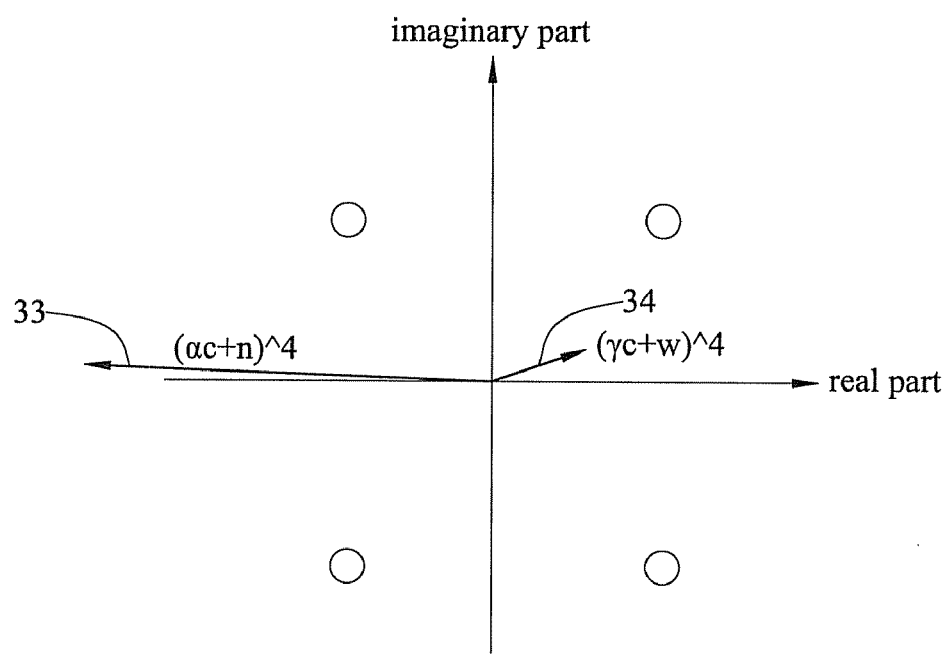
FIG. 4B is a schematic diagram of another statistical characteristic of a QPSK signal and a constellation graph of a method of transmit diversity for wireless communication of a first embodiment according to the present invention.

If signals transmitted from the transmitting terminal to the receiving terminal pertain to MPSK signals, the signals may be to the power of M, where M is any positive integer. Take QPSK as an example. As shown in FIG. 4B, arrows 33 and 34 represent signals $(\alpha c+n)^4$ and $(\gamma c+w)^4$ (where n and w are noises), respectively, which are signals received by the two receiving antennas to the power of four. Signals that an antenna in use that is pre-selected by the transmitting terminal are close to a negative direction of a real axis, while signals received by the rest antennas are scattered anywhere. If signals received by the receiving terminal shown on FIG. 4B are not added with noises, the arrow may point right to the negative direction of the real axis. Therefore, after a couple of times of perception, the receiving terminal may determines which one of the receiving antennas may receive signals that are closest to the negative direction of the real axis (that antenna is the antenna in use that the transmitting terminal pre-selects).

The Second Embodiment

It is assumed that the receiving terminal has L antennas, signals received include y1[n], y2[n], . . . and yL[n], where n is an index of received symbols, and $y_k[n]=I_k[n]+jQ_k[n]$. Note that y1[n], y2[n], . . . and yL[n] are signals received by the antennas of the receiving terminal.

It is assumed that channel information are constant in S symbols.

It is assumed that when n=0, transmitted signals, i.e., reference symbols, are known to be $c_0=c^*$, for example.

When wireless signals transmitted from the transmitting terminal to the receiving terminal contain the aforesaid reference symbols, the receiving terminal may employ two algorithms. The first one may determine by using the reference symbols only. The second one determines by not only using the reference symbols, but also referring to the aforesaid method that is performed with reference symbols, to improve the correctness.

The First Algorithm:

$$\alpha = \max_{k=1,2,\ldots L}|y_k|,$$

$$\tilde{y}_k = \frac{y_k}{\alpha}, k = 1, 2, \ldots, L,$$

$$d_k = |\tilde{y}_k - c^*|, k = 1, 2, \ldots, L, \text{ and}$$

$$p = \underset{k}{\operatorname{argmin}} d_k.$$

The receiving terminal determines that an antenna p is the antenna in use. The receiving terminal thus selects the antenna p to receive signals and turns of the rest antennas.

The Second Algorithm:

In the beginning, the initially selected antenna p $$\left(p = \underset{k}{\operatorname{arg\,min}} d_k\right)$$

is obtained in the first algorithm, and the rest antennas are not turned off.

Then, use the first, second and third methods in the first embodiment (an embodiment without reference symbols) to obtain $Z_k$.

The First Method:

$$\text{Let } z_k = -\text{Re}\left\{\sum_{n=0}^{S}(y_k)^4\right\}, k = 1, 2, \ldots, L.$$

The Second Method:

$$\text{Let } z_k = \sum_{n=0}^{S}\left(|I_k[n]| + |Q_k[n]| - (\sqrt{2}+1)(|I_k[n]| - |Q_k[n]|)\right).$$

The Third Method:

$$\text{Let } z_k = \sum_{n=0}^{S}(2|I_k[n]Q_k[n]| - |I_k^2[n] - Q_k^2[n]|).$$

$$\text{Let } q = \underset{k}{\text{argmax}}\{z_k\}.$$

When $z_q > \eta z_p$, p is set to be q, $\eta$ is a predefined threshold (a constant), the receiving terminal is let to use the antenna p to receive signals, and the rest antennas are turned off.

It can be understood through the application structure of FIG. 3 and the constellation graph of FIGS. 4A and 4B that the transmitting terminal matches wireless signals by calculating gain coefficients of a better receiving antenna and a better transmitting antenna according to channel state information, and pre-selecting the better receiving antenna from the receiving antennas to be an antenna in use, to allow signals that the antenna in use receives to be a multiple of wireless signals that are not matched, and a strength of signals that the preset antenna receives to be greater than another strength of signals that the rest of the receiving antennas receive. The receiving terminal determines the antenna in use selected by the transmitting terminal according to a statistical characteristic of the received wireless signals that are matched and a constellation graph.

Therefore, the system and method of transmit diversity for wireless communication of the present invention allow a receiving terminal not to evaluate channel, greatly reduce the complexity of the receiving terminal, and obtain the spatial diversity gain effect.

Moreover, the system and method of transmit diversity for wireless communication of the present invention may be applied to a flat fading technique, and may also be applied to, after the corresponding time domain or frequency domain has performed a matching process, orthogonal frequency division multiplexing (OFDM), orthogonal frequency division multiple access (OFDAM), single carrier frequency division multiple access (SC-FDMA), single carrier Block transmission (SCBT) techniques, etc.

Figure 5:
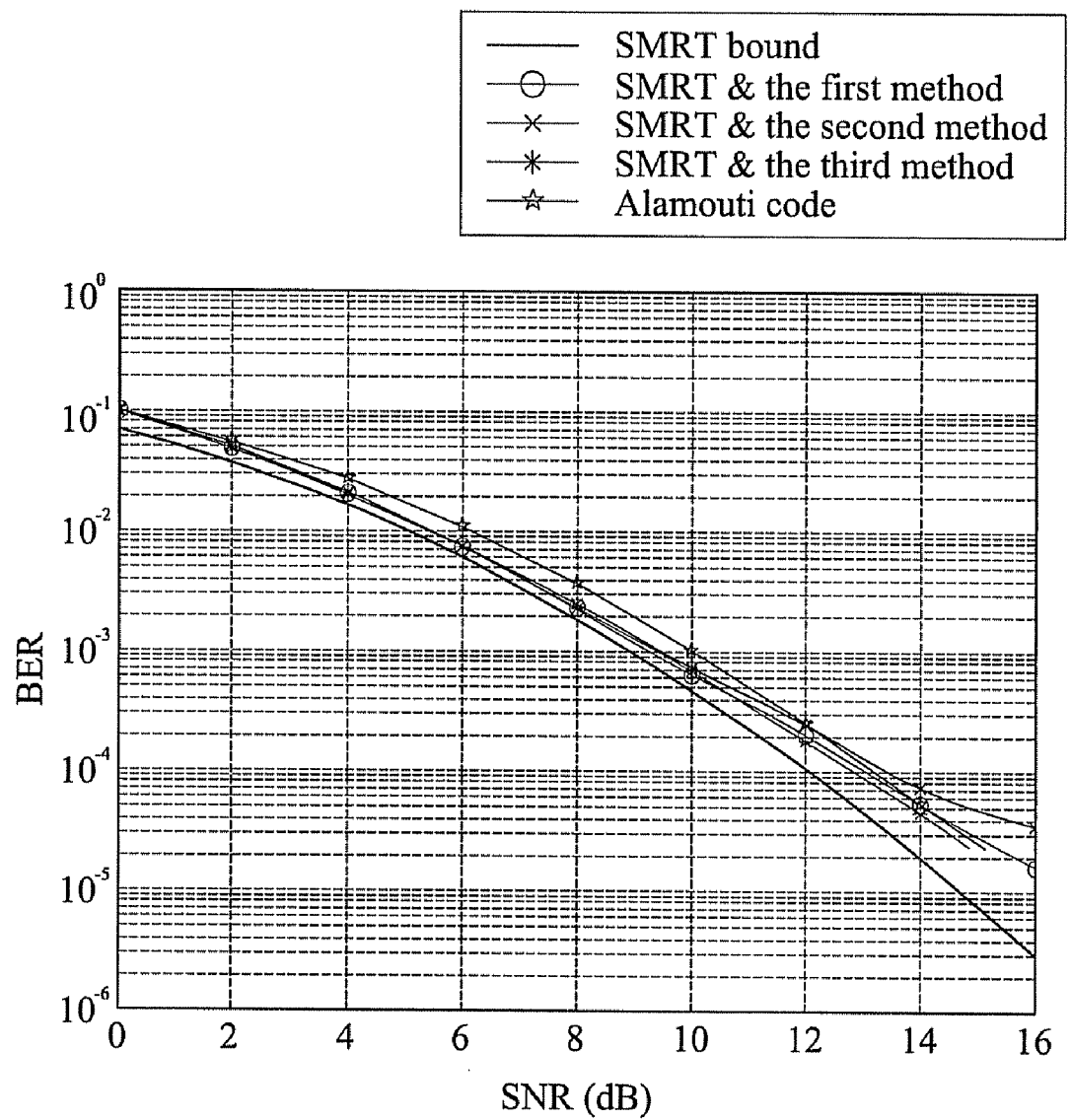
FIG. 5 is a system efficacy graph of a method of transmit diversity for wireless communication, without a reference symbol, according to the present invention.

Referring to FIG. 5, it is a system efficacy graph of a method of transmit diversity for wireless communication according to the present invention.

In a Rayleigh fading channel environment having two transmission antennas and two receiving antennas, QPSK modulates signals transmitted from the transmitting terminal to the receiving terminal into QPSK signals. It is assumed that a channel state is constant during a process that the transmitting terminal sends 40 symbols, and that the transmitting terminal does not transmit reference symbols to the receiving terminal.

As shown in FIG. 5, the abscissa represents a signal-to-noise ratio (Es/No); the coordinate represents a bit error rate (BER); an Alamouti code curve represents a system efficacy of an algorithm used in the prior art; and a SMRT bound curve represents a system efficacy that the receiving terminal may always determine an antenna in use pre-selected by the transmitting terminal, that is a bound efficacy obtained by using the SMRT method. Note that before the signal-to-noise ratio is less than 12 dB, the system efficacy obtained by using the SMRT method and the three aforesaid methods is superior to the system efficacy of the Alamouti code. Additionally, before the signal-to-noise ratio is less than 16 dB, the system efficacy obtained by using the SMRT method and the aforesaid third method is superior to the system efficacy of the Alamouti code.

Figure 6:
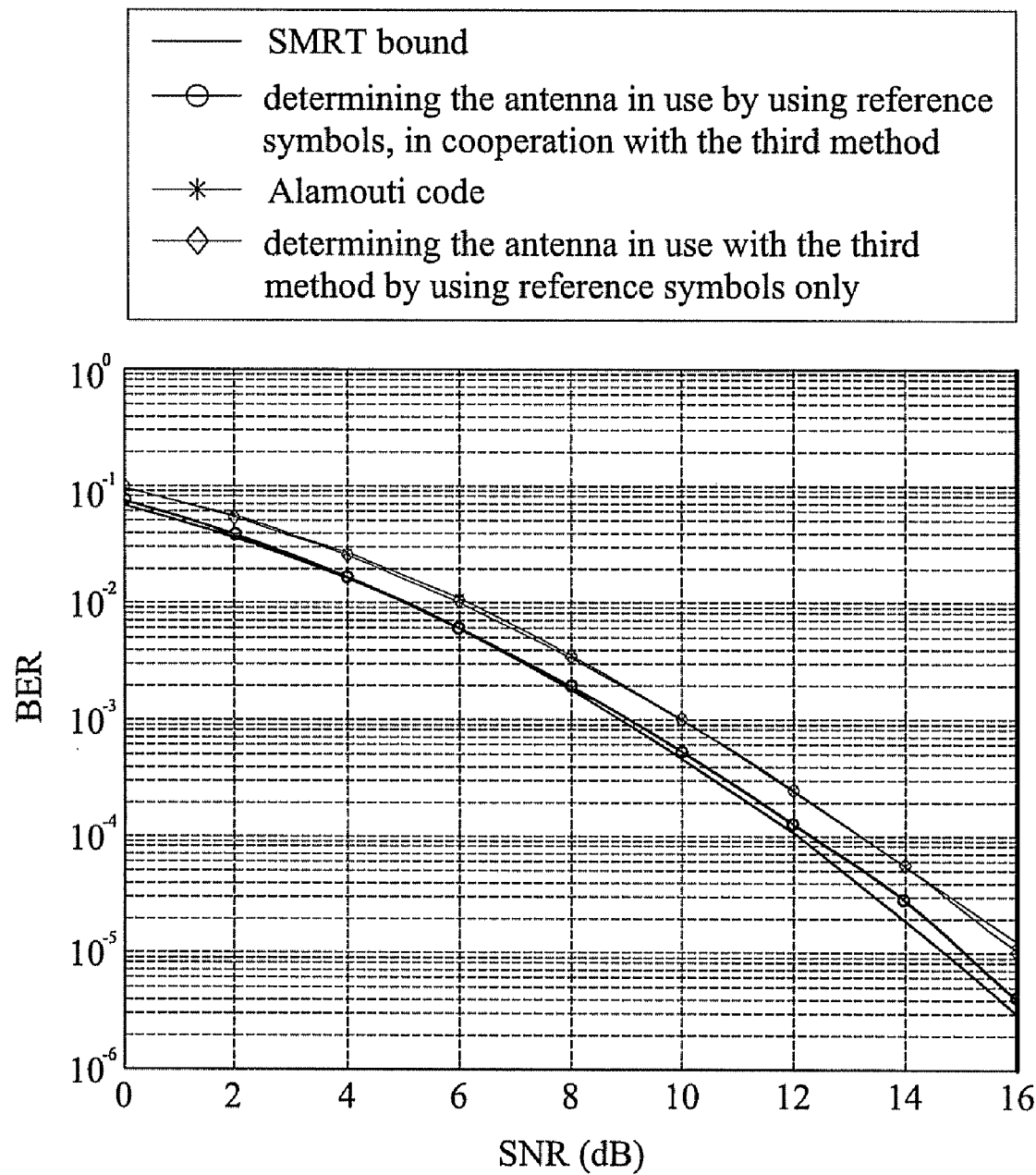
FIG. 6 is a system efficacy graph of a method of transmit diversity for wireless communication, with a reference symbol, according to the present invention.

As to FIG. 6, it is different from FIG. 5 in that the transmitting terminal in FIG. 6 transmits reference symbols to the receiving terminal. It can be known from FIG. 6 that in a condition that the transmitting terminal transmits reference symbols to the receiving terminal, a system curve simulated by the first algorithm employed in the aforesaid second embodiment (which determines the preset antenna in use by using reference symbols only) almost overlaps a system curve of Alamouti code, and another system curve simulated by the second algorithm in cooperation with the aforesaid third method employed in the aforesaid second embodiment (which uses reference symbols, in cooperation with the third method that is performed without reference symbols) almost overlaps the efficacy curve of the SMRT bound.

Therefore, it can be known from FIG. 6 that the receiving terminal, when having reference symbols, may obtain a system efficacy that is almost the same as the prior art. However, if the aforesaid method that is performed without reference symbols is employed additionally, another system efficacy may be obtained that is close to the SMRT bound curve. Further, the two algorithms shown in FIG. 6 are far simpler than the prior art (e.g., the Alamouti algorithm).

In conclusion, the present invention is applied to a multi-input multi-output system, wherein a receiving terminal transmits pilot signals at a predetermined interval, for providing a transmitting terminal to evaluate channel state information. Accordingly, the transmitting terminal uses channel state information obtained from the evaluation and the aforesaid method that is employed to calculate a better receiving antenna and better gain coefficients to pre-select a receiving antenna from a plurality of receiving antennas to be an antenna in use. Signals received by the antenna in use are a real multiple of wireless signals that are not matched by the transmitting terminal. Under a condition that no noises are added to the receiving terminal, a strength of signals that the antenna in use receives is greater than another strength of signals that the rest of the receiving antennas receive. The receiving terminal determines the antenna in use according to a statistical characteristic of the received wireless signals that are matched and a constellation graph.

Therefore, the system and method of transmit diversity for wireless communication of the present invention may perform a wireless communication process under a condition that the receiving terminal does not know channel state information, without consuming the efficacy of the communication system. Accordingly, the hardware and algorithm of the receiving terminal are greatly simplified, and the advantages of the spatial diversity technique of the receiving terminal are brought into practice.

The foregoing descriptions of the detailed embodiments are only illustrated to disclose the features and functions of the present invention and not restrictive of the scope of the present invention. It should be understood to those in the art that all modifications and variations according to the spirit and principle in the disclosure of the present invention should fall within the scope of the appended claims.

What is claimed is:

1. A system of transmit diversity for wireless communication, comprising:
    a transmitting terminal having a plurality of channel state information, comprising:
        a processing module for analyzing the channel state information and matching wireless signals that are to be transmitted; and
        a plurality of transmission antennas for transmitting wireless signals that are matched; and
    a receiving terminal, comprising:
        a plurality of receiving antennas for receiving the wireless signals that are matched from the transmitting terminal; and
        a determination module for calculating the wireless signals that are matched received by the receiving antennas to select at least one antenna from the receiving antennas that has a better channel state to be an antenna in use,
    wherein the transmitting terminal, before transmitting the wireless signals that are matched, pre-selects the antenna in use from the receiving antennas according to the channel state information, and processes the wireless signals to allow the wireless signals to be matched with the antenna in use.

2. The system of claim 1, wherein the receiving terminal transmits pilot signals to each of the transmission antennas via each of the receiving antennas at a predetermined interval, allowing the transmitting terminal to evaluate a channel state according to the pilot signals and obtain the channel state information.

3. The system of claim 1, wherein the processing module matches the wireless signals by analyzing the channel state information and adjusting a gain of each of the transmission antennas, to allow the wireless signals to be matched with the antenna in use.

4. The system of claim 3, wherein that the wireless signals are matched with the antenna in use means that the wireless signals that are matched received by the antenna in use are a real multiple of the wireless signals, and that a strength of signals that the antenna in use receives is greater than another strength of signals that the rest of the receiving antennas receive.

5. The system of claim 1, wherein the receiving terminal calculates the wireless signals that are matched according to a statistical characteristic of the received wireless signals that are matched and a constellation graph.

6. A method of transmit diversity for wireless communication, applicable to a wireless communication system including a transmitting terminal having a plurality of transmission antennas and a receiving terminal having a plurality of receiving antennas, the method comprising the following steps of:
    (1) enabling each of the receiving antennas to transmit pilot signals to each of the transmission antennas;
    (2) enabling the transmitting terminal to evaluate a channel state according to the pilot signals, and to obtain a plurality of channel state information;
    (3) enabling the transmitting terminal to analyze the channel state information, to pre-select one from the receiving antennas to be an antenna in use;
    (4) enabling the transmitting terminal to match wireless signals that are to be transmitted with the antenna in use;
    (5) enabling the transmitting terminal to transmit the wireless signals that are matched to the receiving terminal; and
    (6) enabling the receiving terminal to receive the wireless signals that are matched from the transmitting terminal, and to calculate the wireless signals that are matched, to determine the antenna in use that is pre-selected by the transmitting terminal.

7. The method of claim 6, wherein in step (1) each of the receiving antennas transmit the pilot signals to each of the transmission antennas at a predetermined interval.

8. The method of claim 6, wherein in step (4) the transmitting terminal matches the wireless signals that are to be transmitted with the antenna in use by adjusting a gain of each of the transmission antennas, to allow the wireless signals to be matched with the antenna in use.

9. The method of claim 8, wherein that wireless signals are matched with the antenna in use means that the wireless signals that are matched received by the antenna in use are a real multiple of the wireless signals, and that a strength of signals that the antenna in use receives is greater than another strength of signals that the rest of the receiving antennas receive.

10. The method of claim 6, wherein in step (6) the receiving terminal calculates the wireless signals that are matched according to a statistical characteristic of the received wireless signals that are matched and a constellation graph.

* * * * *